(12) United States Patent
Lefort et al.

(10) Patent No.: US 11,474,647 B2
(45) Date of Patent: Oct. 18, 2022

(54) CONTROL SYSTEM FOR A VEHICLE

(71) Applicant: FAURECIA INTERIEUR INDUSTRIE, Nanterre (FR)

(72) Inventors: Jean-Baptiste Lefort, Margny-les-Compiegne (FR); Ahamed El Sayed, Chanteloup les Vignes (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 118 days.

(21) Appl. No.: 17/124,476

(22) Filed: Dec. 16, 2020

(65) Prior Publication Data
US 2021/0181875 A1 Jun. 17, 2021

(30) Foreign Application Priority Data

Dec. 17, 2019 (FR) ...................................... 19 14598

(51) Int. Cl.
| | | |
|---|---|---|
| *G06F 3/044* | (2006.01) | |
| *G06F 3/041* | (2006.01) | |
| *B60H 1/00* | (2006.01) | |
| *B60K 37/06* | (2006.01) | |

(52) U.S. Cl.
CPC ............ *G06F 3/044* (2013.01); *G06F 3/0416* (2013.01); *B60H 1/0065* (2013.01); *B60K 37/06* (2013.01); *B60K 2370/1434* (2019.05)

(58) Field of Classification Search
None
See application file for complete search history.

(56) References Cited

U.S. PATENT DOCUMENTS

| | | | |
|---|---|---|---|
| 2010/0199212 A1* | 8/2010 | Heers ...................... | B60K 37/06 715/810 |
| 2017/0052617 A1* | 2/2017 | Okuzumi .............. | G06F 3/0362 |
| 2018/0024649 A1 | 1/2018 | Uno | |

FOREIGN PATENT DOCUMENTS

| | | |
|---|---|---|
| DE | 102010010574 A1 | 9/2011 |
| DE | 102015002299 A1 | 8/2016 |
| FR | 3033422 A1 | 9/2016 |
| FR | 3056474 A1 | 3/2018 |
| WO | 2018114138 A1 | 6/2018 |

OTHER PUBLICATIONS

French Search Report corresponding to French Application No. FR 1914598, dated Dec. 2, 2020, 2 pages.

* cited by examiner

*Primary Examiner* — Stephen T. Reed
(74) *Attorney, Agent, or Firm* — Reising Ethington P.C.

(57) ABSTRACT

A control system including a touch-sensitive surface and an actuator fixed to the touch-sensitive surface, the actuator having a control element rotatable relative to the touch-sensitive surface between at least two selection positions. The actuator has a first sensor element rotationally fixed to the control element and coupled to the touch-sensitive surface in all selection positions, and a second sensor element. The control element is translationally movable relative to the touch-sensitive surface between a selected position and a release position. The second sensor element is rotationally fixed to the element and uncoupled from the touch-sensitive surface in the selected position and coupled to the touch-sensitive surface in the release position.

9 Claims, 2 Drawing Sheets

CONTROL SYSTEM FOR A VEHICLE

This application claims the benefit of French Patent Application No. FR 19 14598 filed on Dec. 17, 2019, which is hereby incorporated by reference.

TECHNICAL FIELD

The present invention relates to a control system for a vehicle, of the type comprising:
- a touch-sensitive surface,
- at least one actuator attached to the touch-sensitive surface, the actuator comprising a main body attached to the touch-sensitive surface, and a control element rotatable relative to the touch-sensitive surface around a first direction substantially perpendicular to the touch-sensitive surface between at least two selection positions,
- the actuator comprising at least a first sensor element which is rotationally fixed to the control element, the first sensor element being coupled to the touch-sensitive surface in all selection positions of the control element,
- the actuator comprising at least a second sensor element.

BACKGROUND

Such a control system may be, for example, integrated into a vehicle trim element, such as a dashboard lining, a control panel, a centre console between the two front or rear seats of the vehicle, a display device or other. The control system allows the user to interact with the display device to display information useful to the driver and/or passengers such as navigation information, pictograms, etc. and/or to control certain vehicle functions.

When the first or second sensor element is coupled to the touch-sensitive surface, i.e. in contact with the touch-sensitive surface or at a predetermined distance from the touch-sensitive surface so as to be detected by the touch-sensitive surface, the position of the first and/or second sensor element on the touch-sensitive surface is determined. This interaction is similar to that between a user's finger and the touch-sensitive surface.

Rotation of the actuator allows, for example, the selection of a parameter from a plurality of parameters or the adjustment of the intensity of a parameter (e.g. sound volume in the passenger compartment, temperature in the passenger compartment, etc.). The translation of the actuator to the touch-sensitive surface allows the validation of the parameter selected by the user or the validation of the intensity of the parameter selected by the user.

US document 2017/0052617 A1 describes such a control system. However, this control system is complex and cumbersome, especially because the selection function and the validation function are performed by operating two separate parts of the control system.

SUMMARY

An objective of the invention is to provide a control system that is easy to handle while reducing the area of the touch-sensitive surface occupied by the actuator.

To this end, the invention relates to a control system of the aforementioned type, wherein the main body is formed by a crown defining a through-opening, the control element being movable in translation relative to the touch-sensitive surface according to a first direction between a selected position and a release position in all selection positions, the second sensor element being rotationally fixed to the control element and being decoupled from the touch-sensitive surface in the selected position and coupled to the touch-sensitive surface in the release position, or vice versa.

In this way, the control system is simplified and more compact because the first sensor element and the second sensor element are rigidly connected to the control element of the actuator. In addition, the control system makes it possible to reduce the area of the touch-sensitive surface occupied by the actuator. Thus, the remaining area of the touch-sensitive surface can be used to display other information and/or functions. This reduces the number of components that make up the control system. The selection and confirmation of the user's choice is made using only the control element, which moves both in rotation and translation relative to the touch-sensitive surface.

According to different embodiments, the display device has one or more of the following features, either individually or in any technically possible combination:
- the touch-sensitive surface is capacitive, and the first sensor element and the second sensor element each comprise at least one conductive body;
- the control element is formed by a ring arranged around the main body, the ring being rotatable around the main body according to the first direction between the plurality of selection positions, the first sensor element and the second sensor element being fixed to the ring, the ring being movable in translation relative to the main body according to the first direction between the selected position and the release position;
- the ring forms a knurled wheel defining a plurality of selection positions;
- the first sensor element and the second sensor element have a different shape and/or size;
- the transition from the selected position to the release position is made by pressing the actuator according to the first direction;
- the system comprises a return device for returning the actuator from the release position to the selected position;
- the control system comprises:
  a control interface for controlling at least one vehicle function,
  a location sensor configured to determine a position of the actuator on the touch-sensitive surface,
  the control interface is arranged according to the determined position of the actuator.
- the projection of the first sensor element onto the touch-sensitive surface and the projection of the second sensor element onto the touch-sensitive surface are substantially discs, the centre of said discs being arranged on a circle centered on the intersection between the first direction and the touch-sensitive surface,
- in the release position, the first sensor element and the second sensor element are arranged on a circle diameter.

According to a second aspect, the invention relates to a vehicle comprising a control system as described above.

BRIEF DESCRIPTION OF THE DRAWINGS

Other features and advantages of the invention will be apparent from the detailed description, which is given below, by way of indication and in no way limiting, with reference to the annexed figures, among which.

DETAILED DESCRIPTION OF EMBODIMENTS

Figure 1:
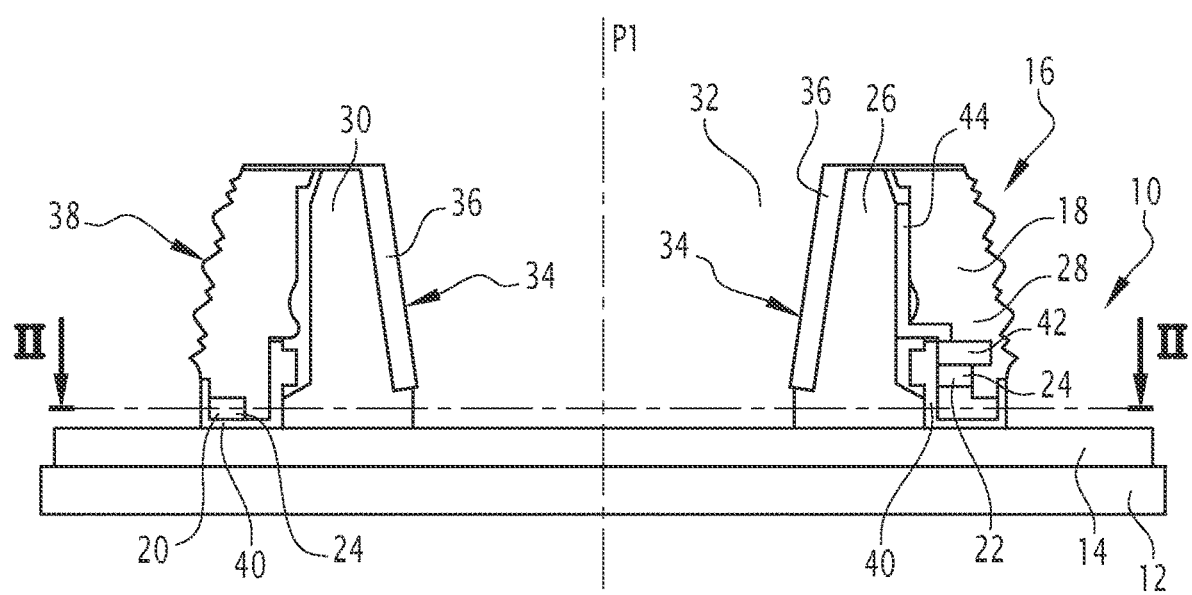
FIG. 1 is a schematic longitudinal section of a control system according to an embodiment of the invention in the selected position.

FIG. 1 schematically represents a vehicle control system 10 according to an embodiment of the invention.

The vehicle (not shown) is for example a motor vehicle.

The control system 10 is, for example, integrated into a vehicle trim element, such as a dashboard lining, a control panel, a center console between the two front seats of the vehicle, a display device or similar.

The control system 10 comprises a touch-sensitive surface 14, and an actuator 16 attached to the touch-sensitive surface 14.

According to a particular embodiment, the system includes a support 12 on which the touch-sensitive surface 14 extends.

The support 12 is, for example, a display device screen. The display device is then typically intended to display information useful to the driver and/or passengers such as navigation information, pictograms, etc. The control system 10 allows the user to interact with the display device. Alternatively, the holder 12 is a simple plate forming the substrate of a touchpad for example.

Advantageously, the control system 10 includes a control interface and a location sensor.

The control interface is configured to control at least one vehicle function.

The interaction between the interface and a user is done by means of the touch-sensitive surface 14.

The location sensor is configured to determine the position of the actuator 16 on the touch-sensitive surface 14, The control interface is arranged according to the position of the actuator 16 that has been determined, i.e., depending on the position of actuator 16 on the touch-sensitive surface 14, the display of the interface on the touch-sensitive surface changes or the control options and parameters of the interface offered to the user change.

The actuator 16 comprises at least one control element 18.

The control element 18 is rotatable relative to the touch-sensitive surface 14 about a first direction P1 substantially perpendicular to the touch-sensitive surface 14 between at least two selection positions.

For example, the control element 18 allows selection of one of a plurality of parameters. To do this, the user turns the control element 18 to the left or right. For example, moving the control element 18 to the right or left will cause a selection slider to move up or down, to the right or left, respectively, from a drop-down list displayed on the display device.

Alternatively, the control element 18 can be used to control the intensity of a parameter, such as the volume level in the passenger compartment or the temperature in the passenger compartment. For example, rotating the control element 18 to the right increases the intensity of the parameter, while rotating the control element 18 to the left decreases the intensity of the parameter.

In addition, the control element 18 can be moved in translation relative to the touch-sensitive surface 14 in the first direction P1 between a selected position and a release position in all the selection positions. A "selected position" is defined as a position which is separate from the release position and is a position away from the touch-sensitive surface 14. Thus, the change from the selected position to the release position is made by pressing the actuator 16, and in particular the control element 18, in the first direction P1. The distance between the control element 18 and the touch-sensitive surface 14 in the selected position is, for example, greater than the distance between the control element 18 and the touch-sensitive surface 14 in the release position.

The control element 18 comprises at least one first sensor element 20 and at least one second sensor element 22 attached to the control element 18 and rotationally fixed to the control element 18. Thus, the rotational movement of the control element 18 in the various selection positions causes the first sensor element 20 and the second sensor element 22 to rotate in the same way.

The first sensor element 20 is coupled to the touch-sensitive surface 14 in all the selection positions of the actuator 16. "Coupled to touch-sensitive surface 14" means that the first sensor element 20 is in contact with touch-sensitive surface 14 or at a predetermined distance from the touch-sensitive surface 14 so that it is detected by the touch-sensitive surface 14. The predetermined distance varies depending on the technology of the touch-sensitive surface and is, for example, between 0.3 mm and 1.5 mm.

Thus, in any selection position of the actuator 16, the position of the first sensor element 20 on the touch-sensitive surface 14 is determined.

The second sensor element 22 is decoupled from the touch-sensitive surface 14 in the selected position and coupled to the touch-sensitive surface 14 in the release position. "Uncoupled from the touch-sensitive surface 14" means that the second sensor element 20 is arranged at a distance from the touch-sensitive surface 14 so that it cannot be detected by the touch-sensitive surface 14.

Preferably, the touch-sensitive surface 14 is a capacitive touch-sensitive surface, and the first sensor element 20 and the second sensor element 22 each comprise at least one conductive body 24.

Thus, the touch-sensitive surface 14 includes, for example, an indium-based layer (not shown) that allows electrical charges present in the layer to move through it. When the conductive body 24 of the first sensor element 20 and/or the second sensor element 22 is coupled to the touch-sensitive surface 14, some electrical charges are transferred to the conductive body 24 creating a quantifiable charge deficit in the layer. With a sensor in each of the corners of the touch-sensitive surface 14, it is possible at any time to measure and determine the coordinates of the contact on the touch-sensitive surface between the conductive body 24 and the touch-sensitive surface 14, and thus the position of the first sensor element 20 and/or the second sensor element 22 on the touch-sensitive surface.

Alternatively, the touch-sensitive surface 14 is a touch-sensitive surface with surface waves, a resistive touch-sensitive surface, an induction touch-sensitive surface, an infrared touch-sensitive surface, etc. Both the first sensor element 20 and the second sensor element 22 then include a body suitable to be detected by the touch-sensitive surface 14.

Figure 2:
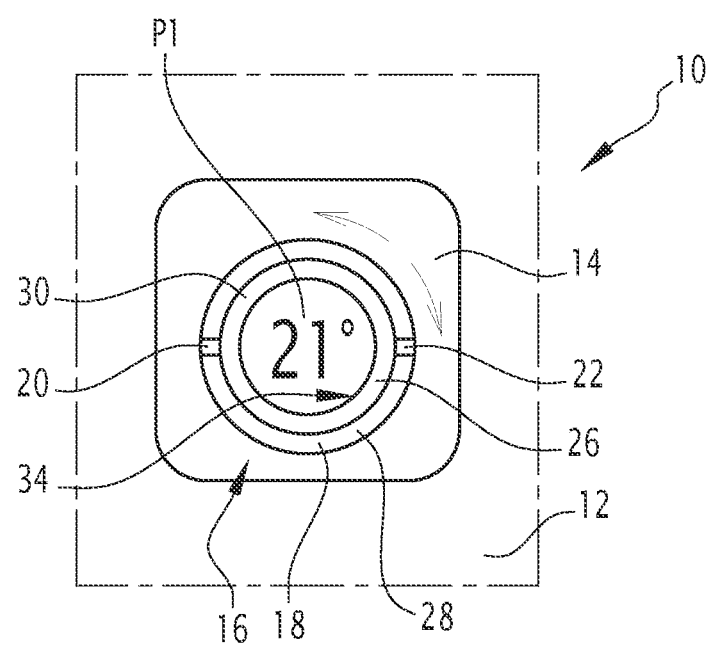
FIG. 2 is a cross-section passing through the first sensor element and the second sensor element of the system in FIG. 1 in the release position.

In the example in FIGS. 1 and 2, the actuator 16 also has a main body 26 attached to the touch-sensitive surface 14. The main body 26 is attached to the touch-sensitive surface 14 and remains stationary in all selection positions, in the selected position and in the release position.

For example, the main body 26 is glued to the touch-sensitive surface 14 or screwed to the support 12. Alternatively, the main body 26 is part of the support 12 and the touch-sensitive surface extends around the main body 26.

In the example in FIGS. 1 and 2, in which the support 12 is covered with a capacitive touch-sensitive surface 14, the main body 26 and the control element 18 are made of a non-conductive material such as plastic in order to avoid interaction with the touch-sensitive surface 14.

The control element 18 is formed by a ring 28 arranged around the main body 26.

The ring 28 is thus rotatable around the main body 26 about the first direction P1 between the plurality of selection positions and translatable relative to the main body 26 in the first direction P1 between the selected position and the release position.

Preferably, the main body 26 is formed by a crown 30 defining a through opening 32. Thus, the through-opening 32 reveals the touch-sensitive surface 14. This makes it possible to display information on the touch-sensitive surface 14 at the through-opening 32. For example, as shown in FIG. 2, the through-opening 32 allows the value of a parameter such as the temperature of the passenger compartment to be displayed.

For example, the interior surface 34 of the through-opening 32 is covered with a decorative layer 36 to give the actuator 16 an aesthetic and decorative appearance. For example, the decorative layer 36 is a metallic layer.

Advantageously, the ring 28 forms a notched knurl defining a plurality of stable selection positions. Together with the main body 26, ring 28 forms a haptic device. When the user turns ring 28, a predetermined rotational force is required to change from one stable selection position to another stable selection position. This enables the user to know precisely the angular distance travelled by ring 28 and to feel the transition between the different selection positions.

In addition, the rotational movement of ring 28 causes, for example, a clicking sound audible to the user when moving from one stable selection position to another.

Preferably, the outer surface 38 of the ring is uneven, for example knurled, to improve the user's grip on the ring 28.

The first sensor element 20 and the second sensor element 22, for example, are parallelepipedal or cylindrical in shape.

The dimensions are chosen so that when they are coupled to the touch-sensitive surface 14, they are detected by the touch-sensitive surface 14.

Advantageously, the first sensor element 20 and the second sensor element 22 have a different shape and/or size.

This makes it possible to better differentiate between the first sensor element 20 and the second sensor element 22 on the touch-sensitive surface 14, i.e., both the first sensor element 20 and the second sensor element 22 have a distinct signature on the touch-sensitive surface 14.

The first sensor element 20 and the second sensor element 22 comprise at least one outer surface 40 lying in a plane substantially parallel to the touch-sensitive surface 14.

As can be seen in FIG. 1, in the selected position of the actuator 16, the first sensor element 20 and the second sensor element 22 are arranged at a different distance from the touch-sensitive surface 14.

As shown in FIG. 2, the projection of the first sensor element 20 and the projection of the second sensor element 22 onto the touch-sensitive surface 14 are arranged on a circle centered on the intersection between the first direction P1 and the touch-sensitive surface 14.

In other words, in the release position, the first sensor element 20 and the second sensor element 22 are arranged on said circle.

The angular distance between the projections of the first sensor element 20 and the second sensor element 22 is, for example, between 90° and 270°.

In the example in FIG. 2, the angular distance between the projections of the first sensor element 20 and the second sensor element 22 is 180°. In other words, the projection of the first sensor element 20 and the projection of the second sensor element 22, or the first sensor element 20 and the second sensor element 22 in the release position, are arranged on a circle diameter.

The angular distance between the projections of the first sensor element 20 and the second sensor element 22 is advantageously chosen in relation to the resolution of the touch-sensitive surface 14 so that the signature associated with the coupling of each of the sensor elements 20, 22 can be distinguished from each other, i.e. a position on the touch-sensitive surface 14 for each of the sensor elements 20, 22 can be determined. An angular distance of 180° maximises the distance between the two sensor elements 20, 22 and thus promotes good detection of each of the elements 20, 22 on the touch-sensitive surface 14.

The control system 10 also includes a device 42 for moving the second sensor element 22 in the first direction P1 in relation to the touch-sensitive surface 14.

When the actuator 16 is moved from the selected position to the release position, the movement device 42 of the second sensor element 22 moves the second sensor element 22 translationally relative to the touch-sensitive surface 14 in a direction substantially parallel to the first direction P1. The second sensor element 22 is then coupled to the touch-sensitive surface 14 in the release position. It is decoupled from the touch-sensitive surface 14 in the selected position.

Advantageously, the control system 10 also comprises a return device 44 of the actuator 16 from the release position to the selected position. The return device 44 of actuator 16 cooperates with the movement device 42 of the second sensor element 22 so that when the return device 44 moves the actuator 16, and in particular the control element 18, from the release position to the selected position, the movement device 42 of the second sensor element 22 moves the second sensor element 22 from the position coupled to the touch-sensitive surface 14 to a position uncoupled from the touch-sensitive surface 14.

The operation of the device will now be described.

For example, the control system 10 is associated with a device for displaying the temperature of the vehicle's passenger compartment and makes it possible to control the set temperature.

The user turns the control element 18, i.e. the ring 28, around the main body 26 to the right or left depending on whether he wishes to increase or decrease the value of the setpoint temperature. For example, by turning control element 18 to the right, he increases the setpoint temperature. In contrast, turning the control element 18 to the left decreases the setpoint temperature. Turning the control element 18 causes sensor elements 20, 22 to rotate.

Since the first sensor element 20 is coupled to the touch-sensitive surface 14 in all selection positions of the actuator, the position of the first sensor element on the touch-sensitive surface 14 is known for all selection positions. The information about the change in position of the first sensor element 20 is then converted into a command, in this case an increase or decrease in the setpoint temperature desired by the user.

The user confirms his choice by pressing the control element 18, which moves in translation towards the touch-sensitive surface 14 in the first direction P1. The actuator 16 then moves from the selected position to the release position: the second sensor element 22 moves from the position uncoupled from the touch-sensitive surface 14 to the position coupled to the touch-sensitive surface 14 by means of movement device 42 of the second sensor element 22. The information about this change in position of the second sensor element 22 is then converted into a command, i.e. an acknowledgement of the selection made by rotating the control element 18.

The user releases the control element 18, which returns to a selection position (and the selected position) by means of the return device 44 of control element 18. When the operating element 18 is released, the second sensor element 22 moves from the position coupled to the touch-sensitive surface 14 to the position uncoupled from the touch-sensitive surface 14 by means of the movement device 42.

Such a sequence of operations is, for example, coupled with a display on the screen forming the support 12. Thus, when the user turns the control element 18, the display is changed from the display of the temperature in the passenger compartment to the display of the temperature corresponding to the new temperature desired by the user. In this way, the user knows that if he confirms his choice by pressing the control element, the setpoint temperature will be the one shown on the display.

A second embodiment will now be described by differences from the first embodiment described below.

In this embodiment, in all selection positions of the actuator 16, the first sensor element 20 and the second sensor element 22 are coupled to the touch-sensitive surface 14.

When the actuator 16 is moved from the selected position to the release position, the movement device 42 of the second sensor element 22 moves the second sensor element 22 translationally relative to the touch-sensitive surface 14 in a direction substantially parallel to the first direction P1 so that the second sensor element 22 is uncoupled from the touch-sensitive surface 14.

Advantageously, the return device 44 of the actuator 16 cooperates with the movement device 42 of the second sensor element 22 so that when the return device 44 moves the actuator 16, in particular the control element 18, from the release position to the selected position, the movement device 42 of the second sensor element 22 moves the second sensor element 22 from a position uncoupled from the touch-sensitive surface 14 to a position coupled to the touch-sensitive surface 14.

The invention claimed is:

1. A control system for a vehicle, the system comprising:
a touch-sensitive surface, and
at least one actuator fixed to the touch-sensitive surface, the actuator comprising a main body fixed to the touch-sensitive surface, and a control element rotatable relative to the touch-sensitive surface about a first direction perpendicular to the touch-sensitive surface between at least two selection positions,
the actuator comprising at least a first sensor element rotationally fixed to the control element, the first sensor element being coupled to the touch-sensitive surface in all selection positions of the actuator,
the actuator comprising at least one second sensor element,
the main body being formed by a crown defining a through opening,
the control element being movable in translation relative to the touch-sensitive surface in the first direction between a selected position and a release position in all selection positions,
the second sensor element being rotationally fixed to said control element and being decoupled from the touch-sensitive surface in the selected position, and coupled to the touch-sensitive surface in the release position, or vice versa.

2. The system according to claim 1 wherein, the touch-sensitive surface is capacitive and, the first sensor element and the second sensor element each comprise at least one conductive body.

3. The system according to claim 1, wherein the control element is formed by a ring disposed around the main body, the ring being rotatable around the main body in the first direction between the plurality of selection positions, the first sensor element and the second sensor element being fixed to the ring, the ring being movable in translation relative to the main body in the first direction between the selected position and the release position.

4. The system according to claim 3, wherein the ring is a knurled wheel movable among a plurality of selection positions.

5. The system according to claim 1, wherein the first sensor element and the second sensor element have a different shape and/or size.

6. The system according to claim 1, wherein the transition from the selected position to the release position is made by pressing the actuator in the first direction.

7. The system according to claim 1, further comprising a return device for returning the actuator from the release position to the selected position.

8. The system according to claim 1, comprising:
a control interface for controlling at least one vehicle function, and
a location sensor configured to determine a position of the actuator on the touch-sensitive surface,
the control interface being arranged in accordance with the determined position of the actuator.

9. A vehicle comprising a control system according to claim 1.

* * * * *